(No Model.) 5 Sheets—Sheet 1.
J. C. FAY.
COW MILKING MACHINE.
No. 510,964. Patented Dec. 19, 1893.
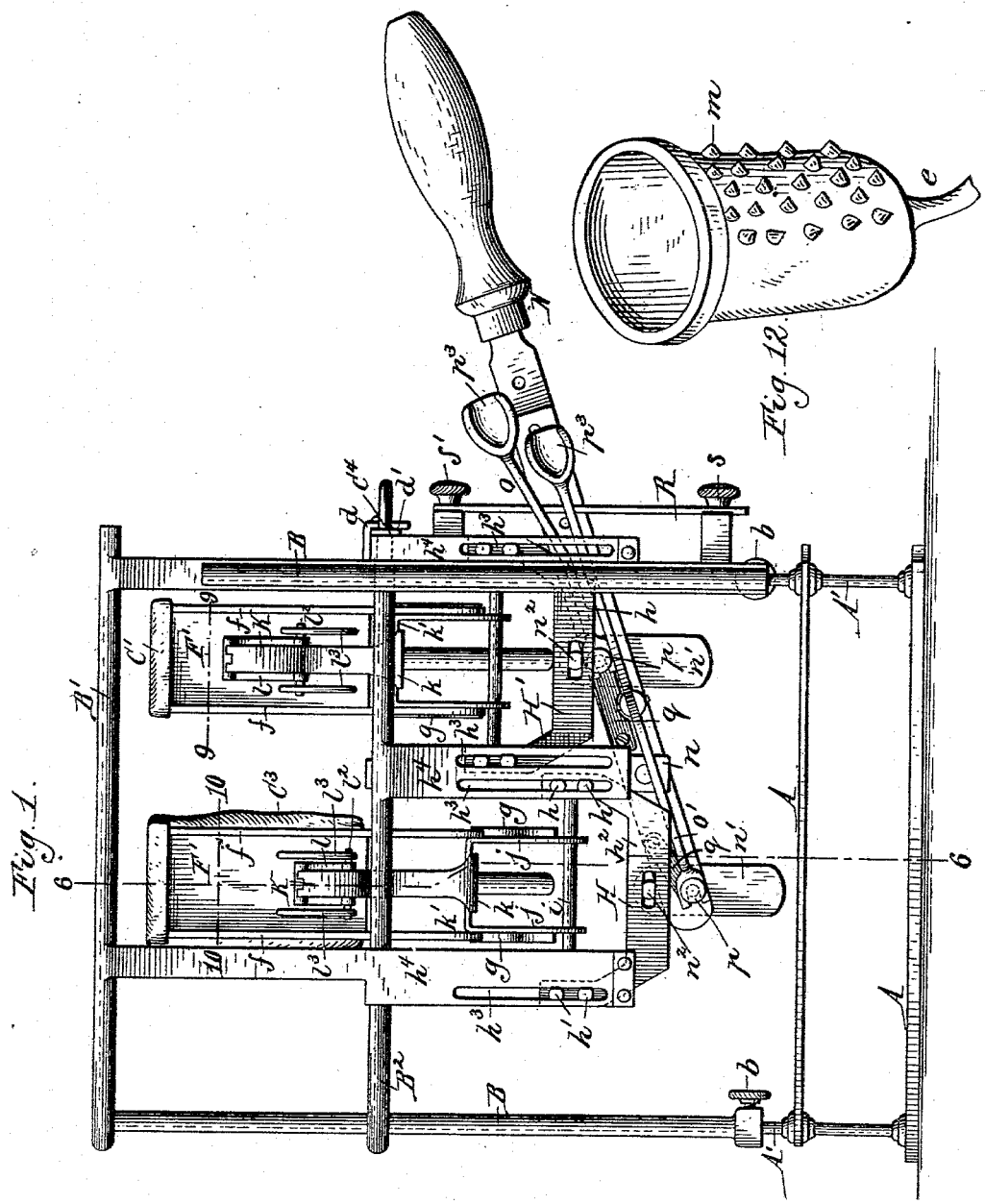

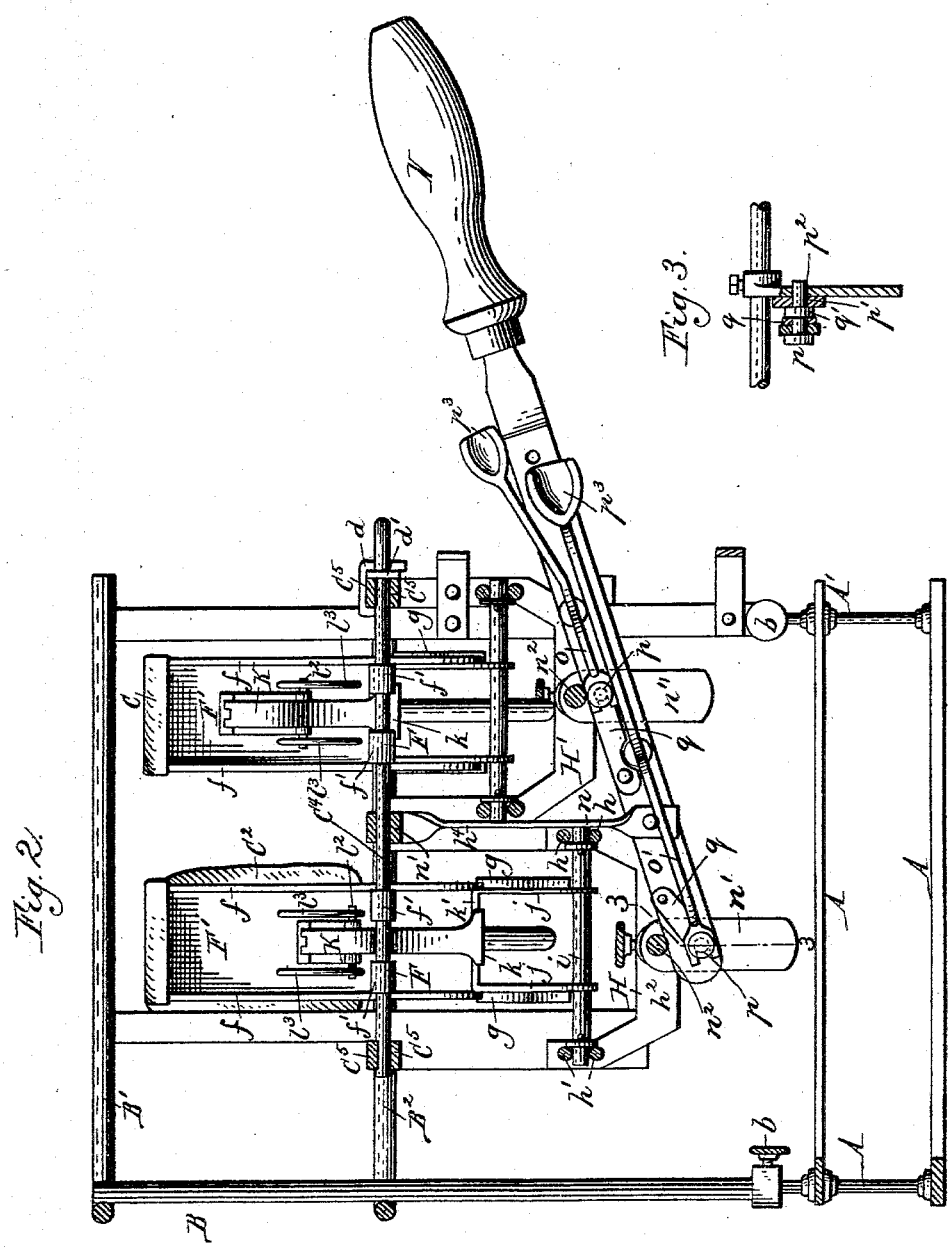

(No Model.) 5 Sheets—Sheet 3.
J. C. FAY.
COW MILKING MACHINE.

No. 510,964. Patented Dec. 19, 1893.

Witnesses:
F. Gustav Wilhelm.
Emil Neuhart

Josiah C. Fay Inventor
By Wilhelm & Bonner Attorneys.

(No Model.) 5 Sheets—Sheet 4.

J. C. FAY.
COW MILKING MACHINE.

No. 510,964. Patented Dec. 19, 1893.

Witnesses:
F. Gustav Wilhelm
Emil Neuhart

Josiah C. Fay Inventor
By Wilhelm Bonner
Attorneys.

(No Model.)  5 Sheets—Sheet 5.
J. C. FAY.
COW MILKING MACHINE.
No. 510,964. Patented Dec. 19, 1893.
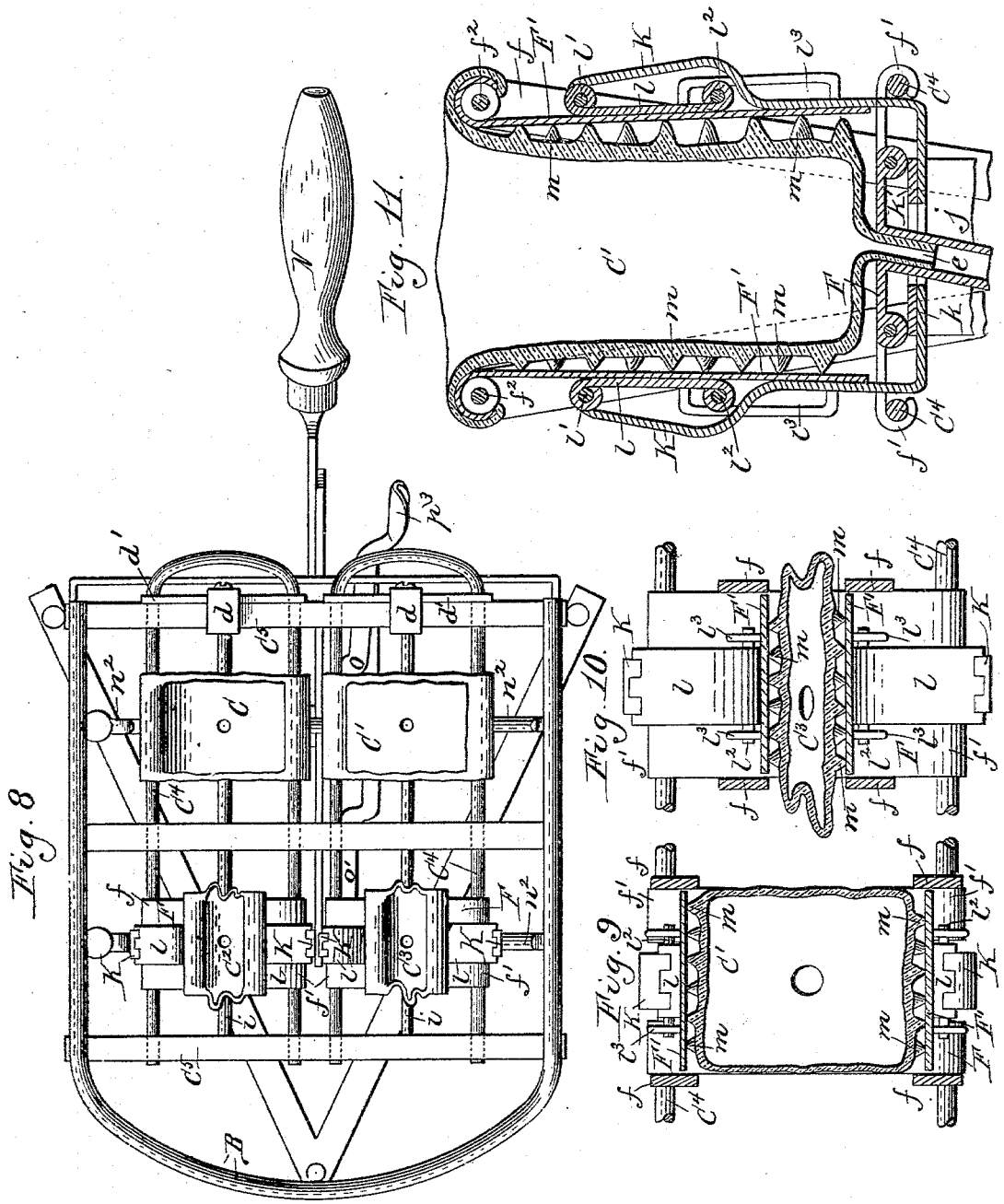
Witnesses:
F. Gustav Wilhelm
Emil Neuhart
Josiah C. Fay  Inventor.
By Wilhelm Bonner
Attorneys.

UNITED STATES PATENT OFFICE.

JOSIAH C. FAY, OF SOUTHBOROUGH, MASSACHUSETTS.

COW-MILKING MACHINE.

SPECIFICATION forming part of Letters Patent No. 510,964, dated December 19, 1893.

Application filed February 28, 1893. Serial No. 464,062. (No model.)

*To all whom it may concern:*

Be it known that I, JOSIAH C. FAY, a citizen of the United States, residing at Southborough, in the county of Worcester and State of Massachusetts, have invented new and useful Improvements in Cow-Milking Machines, of which the following is a specification.

This invention relates to cow milking machines of that class in which the teats of the cow are subjected to a squeezing action, as distinguished from machines which withdraw the milk by suction.

The objects of my invention are to render the teat cups or receptacles conveniently adjustable to the position of the teats, to provide the teat cups with compressing devices which closely imitate the action of the hand in milking, to provide simple means for varying the stroke of such compressing devices, and to improve the machine in various details of construction.

Figure 5:
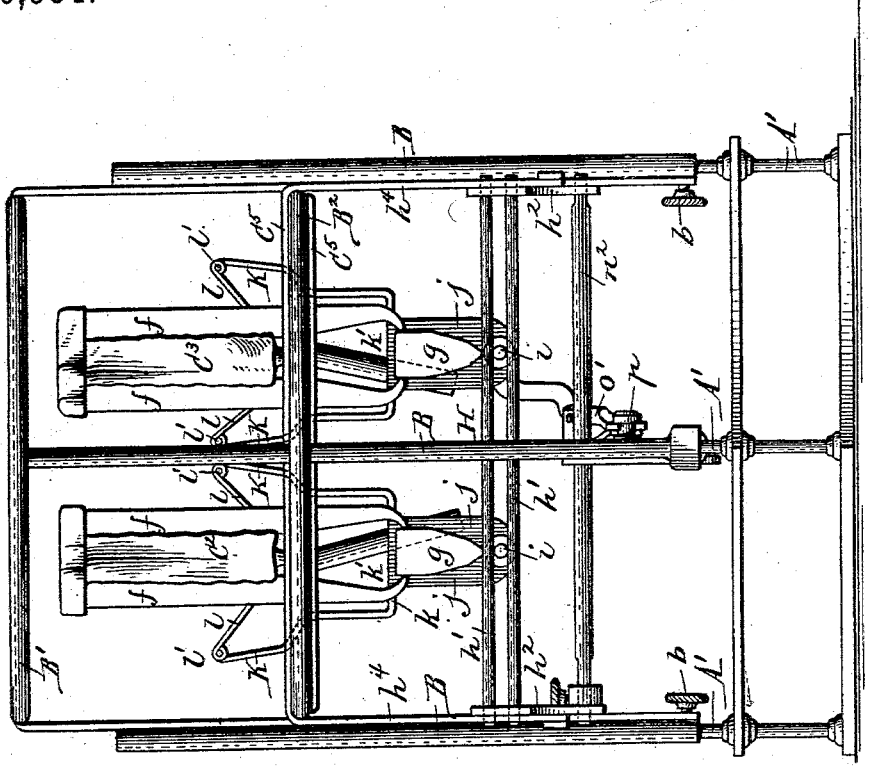
Figure 4:
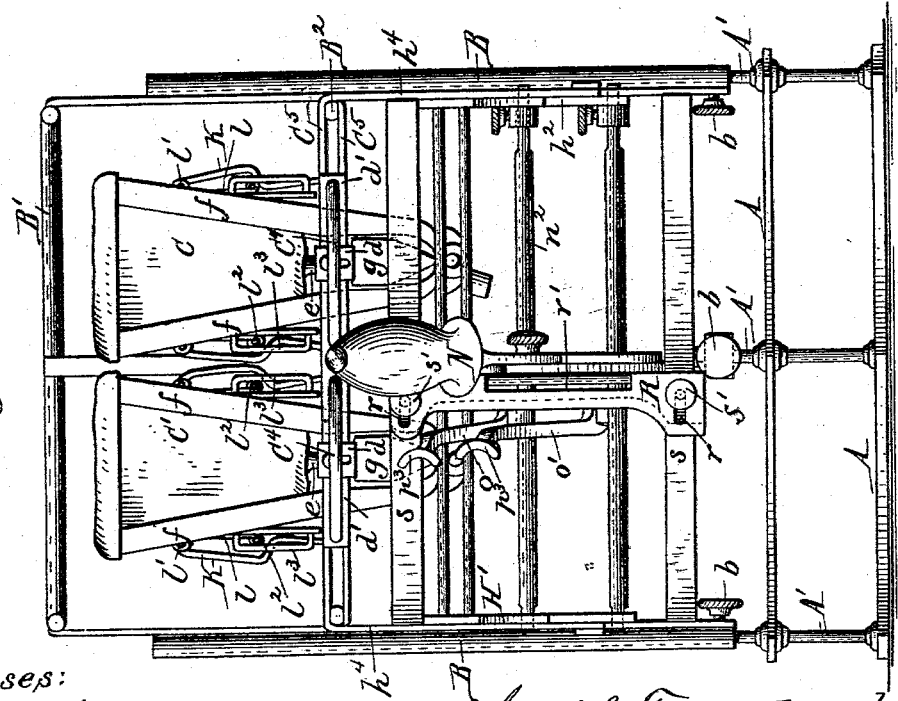
Figure 6:
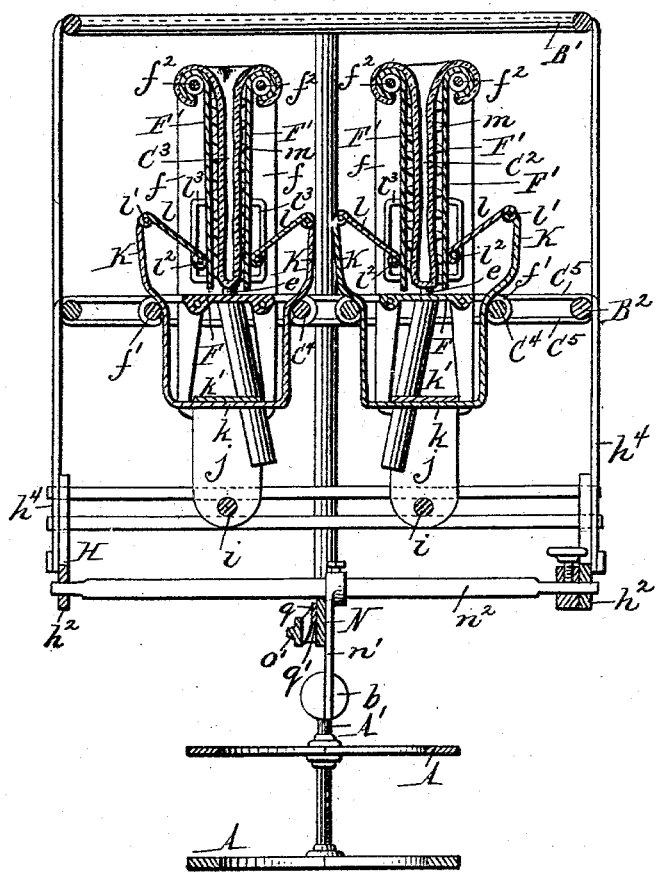
Figure 7:
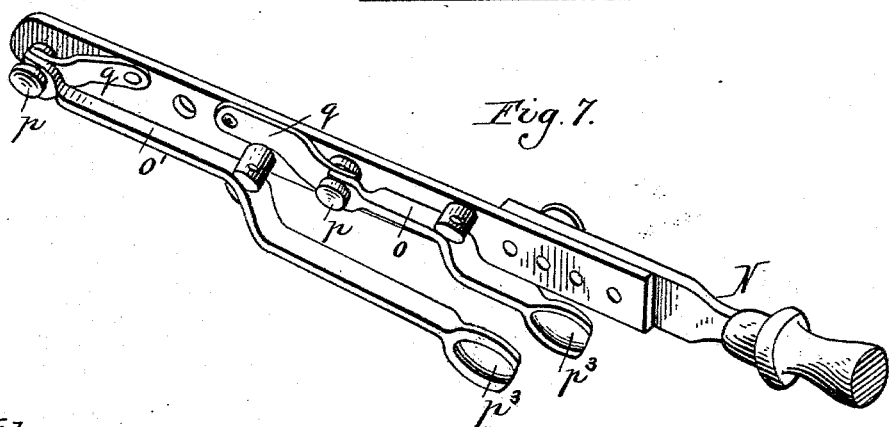

In the accompanying drawings consisting of five sheets: Figure 1 is a side elevation of my improved cow milker. Fig. 2 is a sectional elevation thereof. Fig. 3 is a fragmentary vertical section in line 3—3, Fig. 2. Fig. 4 is a front elevation of the machine. Fig. 5 is a rear view thereof. Fig. 6 is a vertical cross section in line 6—6, Fig. 1. Fig. 7 is a detached perspective view of the hand lever for operating the machine. Fig. 8 is a top plan view of the machine. Fig. 9 is a horizontal section of one of the teat cups in line 9—9, Fig. 1, showing the cup open or expanded. Fig. 10 is a similar section in line 10—10, Fig. 1, showing the cup closed or contracted. Fig. 11 is a vertical central section of one of the teat cups on an enlarged scale, showing the cup expanded. Fig. 12 is a perspective view of one of the cups.

Like letters of reference refer to like parts in the several figures.

The base frame of the machine preferably consists of horizontal bars A A, connected at their rear ends and diverging forwardly in the form of a V. From the front ends and the angle at the rear end of this base-frame, rise posts or supports A'. The main frame of the machine, which is superposed upon this base frame, is preferably made vertically adjustable upon the latter and consists of upright tubular posts B which fit over the posts A' of the base frame in the form of a telescopic connection; a horizontal approximately U-shaped frame B' connected with the upper ends of said tubular posts, and a similar horizontal frame B² secured to said posts at some distance below the upper frame B'. The tubular posts of the main frame carry set screws $b$ which bear against the posts of the base frame. Upon loosening these set screws, the main frame may be adjusted up or down on the base, the main frame being held in its adjusted position by again tightening the screws.

C C' C² C³, represent cups or receptacles which receive the teats of the cow and which, together with their operating devices, are mounted upon horizontal supporting frames C⁴ C⁴. Each of these frames carries the two teat cups located on the same side of the machine, and each frame is preferably constructed in the form of an elongated loop arranged lengthwise of the machine. These two frames are arranged with their front and rear portions between parallel horizontal rods or bars C⁵, which are secured at their ends to the side members of the lower U-shaped frame B², as shown more clearly in Figs. 2, 4, and 6. The loop-shaped frames are free to be shifted laterally between the rods C⁵ which enables the teat cups to be adjusted to the position of the teats. These adjustable frames are held in place by clamps $d$, secured to a cross bar $d'$ connecting the front portion of each loop and which embrace the upper one of said rods, as shown in Figs. 2, 4, and 8.

Each teat cup consists of a flexible sack, preferably constructed of rubber, and provided in its bottom with an opening or nozzle with which is connected a tube $e$ whereby the milk is conducted to a pail or other vessel. These cups are each supported between two upright compressing devices, each having a pair of levers $f$ which are pivoted near their lower ends to a horizontal base plate F which is arranged to slide forwardly and backwardly on the adjacent loop shaped frame C⁴, so that the cups may be adjusted in accordance with the longitudinal distance between the teats. Each of these base plates is provided with an opening for the passage of the discharge tube of the cup and at its lateral edge with guide eyes $f'$ which encircle the members of said loop-shaped frame. These base plates are held in position on said frames by the frictional contact of their eyes with the members of the frame, or by any suitable fastening.

The levers $f$ of each compressing device are connected at their upper ends by a cross bar $f^2$. Between these levers is arranged a pressure plate which is pivoted at its upper end to the cross bar $f^2$ and extends downwardly therefrom nearly to the base plate F, as most clearly shown in Figs. 1, 6, and 11. These pressure plates are free to swing inwardly and outwardly with their lower portions between the levers $f$. Each teat cup is provided at its upper end with an outwardly projecting annular rim, which is attached to the upper ends of the pressure plates by any suitable means.

$g$ are vertically reciprocating wedges or cams arranged between the lower arms of the compressing levers $f$ whereby said arms are spread apart or swung outward so as to cause the upper arms of the levers to close or swing toward each other. One of these wedges is arranged between the opposing lower arms of each pair of levers, as shown. The wedges of the two rear teat cups $C^2$ $C^3$ are carried by a vertically sliding frame H composed of a pair of front rods $h$ and a similar pair of rear rods $h'$, arranged horizontally in the machine and connected at their ends by depressed longitudinal bars $h^2$. The rods of each pair are parallel with each other and guided with their end portions in upright slots $h^3$ formed in supports or hangers $h^4$, depending from the lower U-shaped frame $B^2$.

$i$ are longitudinal rods arranged respectively underneath the two rear teat cups and having their lower end portions confined between the front and rear pairs of transverse rods $h'$ $h'$, as shown in Figs. 2, 4, 5 and 6, so that the rods may take part in the lateral adjustment of the teat cups.

$j$ are arms projecting upwardly from the longitudinal rods $i$ and carrying the wedges $g$, so that upon reciprocating the vertically movable frame H, the wedges are caused to take part in its movement and thereby operate the compressing levers of the two cups simultaneously, the levers being caused to close or approach each other by the downward movement of the frame and free to open or recede from each other during the upward movement of the frame. When this frame descends, the levers are spread apart by the expansion of the compressed teat cup, and as the upper arms of the levers are longer than their lower arms, they overbalance the latter and aid in opening the levers. If desired, the opening action of the expanding teat cups may be supplemented by springs arranged to force out the compressing levers. The compressing levers of the two front teat cups C', C', are actuated by wedges $g$ in the same manner as those of the rear cups and these wedges are carried by an independent vertically reciprocating frame H', constructed and guided in all respects like that which operates the wedges of the rear cups.

K, K, represent a pair of upright arms or standards arranged on opposite sides of each pair of compressing levers and carried by said reciprocating frames. The opposing arms K of each pair of levers are preferably connected at their lower ends by a cross bar $k$ which is secured to a cross piece $k'$, connecting the two wedges of the same set of cups, as shown in Fig. 11. The cross bar $k$ and the cross piece $k'$ are formed with openings for the passage of the discharge tube of the teat cup. The upper end of each arm K is connected with the adjacent pressure plate by a link $l$, pivoted at its upper end to the arm by a transverse pin or cross head $l'$, and provided at its lower end with a cross bar or rod $l^2$ which slides with its end portions in upright guides $l^3$, arranged on the outer side of the pressure plate and extending from the central portion of the plate to, or nearly to its lower end. Each of these guides preferably consists of an elongated staple as shown in Fig. 11. The links $l$ are hung upon the arms K in such a manner that when the links are in their uppermost position, their cross heads are located inwardly beyond the pivot at the upper ends of the links, so that when the arms K are lowered by depressing the reciprocating frame, the links force the pressure plates inwardly as soon as their cross-heads strike the lower ends of the guide staples of the pressure plates. These guides are made of such a length that the cross heads of the links $l$ descend freely in the guides during the first part of the downward movement of the reciprocating frame, so as not to affect the position of the pressure plates, and so that they strike the lower ends of the guides during the last portion of the descending movement of said frame. The wedges $g$ are so arranged, relatively to the lower arms of the compressing levers $f$, that they actuate the levers during the first part of the downward movement of the reciprocating frame. By this arrangement, the compressing devices of the teat cups are closed during the first part of the downward movement of the reciprocating frame by the wedges $g$, and the pressure plates are fully closed during the last part of the downward movement of said frame, while during the upward movement of said frame, both sets of compressing devices open or recede from the teat. By this action, the teats placed in the cups become filled with milk during the upward stroke of the reciprocating frame, while during the downward stroke of said frame, they are first compressed or throttled at their bases, so as to prevent the milk from returning into the udder, and are then compressed below the point at which they are throttled by the closure of the pressure plates, whereby the milk is ejected from the teats, thus closely imitating the process of hand milking.

The front and rear walls of each teat cup are preferably thinner than the side walls thereof which bear against the inner sides of the pressure plates, as shown in Fig. 9, so as to permit these side walls to gather or pucker when the cup is compressed, as shown in Fig. 10. The outer faces of the thickened side walls of the cup are preferably formed with conical projections $m$ which bear with their points against the contiguous sides of the pressure plates as shown in Figs. 9 and 10. These projections permit the thickened walls of the cup to yield to the inequalities of the teat surface and thus conform to the shape of the teat.

The vertically movable frames H H' which actuate the compressing devices of the teat cups are preferably reciprocated alternately in opposite directions, so that milk is ejected from two teats at a time; but if desired, both frames may be operated simultaneously, so as to cause all the teats to deliver milk at the same time.

In the construction shown in the drawings, the frames are moved alternately in opposite directions by a hand lever N pivoted near its rear end to the lower end of a depending arm or hanger $n$ attached to a cross piece $n'$ which is secured to the lower U-shaped frame $B^2$ as shown in Fig. 2. The two reciprocating frames are connected with this hand lever, on opposite sides of its fulcrum, by connecting bars or rods $n''$, attached at their lower ends to the lever and at their upper ends to cross rods $n^2$, secured to the depressed end bars $h^2$ of the reciprocating frames. The connecting rods $n''$ are preferably detachably connected to the hand lever, to permit all the teat cup levers to be opened at the same time for inserting the teats. For this purpose, the hand lever is provided with two catches $o\ o'$, each of which carries a laterally projecting stud or pivot $p$ which passes through an opening $p'$ in the lever and enters a slot or opening $p^2$ formed in the adjacent connecting rod $n'$, as shown in Fig. 3. Each of these catches preferably consists of a lever pivoted between its ends to one side of the hand lever and carrying the stud $p$ at its inner end, and a thumb piece $p^3$ at its outer end. This lever is held in the proper position to retain its stud in engagement with the opening of the connecting rod $n''$ by a flat spring $q$, secured at one end to the side of the lever and bearing with its free end against the outer side of a collar or shoulder $q'$, formed on the stud, as shown in Figs. 3 and 7. Upon depressing the outer end of either of these levers, its stud is withdrawn from the opening of the connecting rod whereby the adjacent reciprocating frame is disconnected from the lever. The outer arms of both levers extend forwardly to within convenient reach of the operator.

R is a movable stop-device attached to the front side of the machine adjacent to the hand lever, for varying the stroke of the hand lever and changing the extent of the opening and closing movement of the compressing devices of the teat cups in accordance with the size of the teats. This stop device consists of an upright bar or plate, secured at its ends to the upper and lower front cross bars $s\ s$ of the main frame, by horizontal clamping bolts $s'$ passing through horizontal slots $r$ formed in the end portions of said bar. This bar is formed in the edge thereof facing the hand lever, with a long notch or recess $r'$ which is adapted to receive the hand lever, when the stop-plate is shifted toward the lever sufficiently to cause it to play in the recess. When the plate is moved into this position, which is indicated by dotted lines in Fig. 4, the abrupt ends of the recess act as stops which limit the stroke of the lever to the length of the recess. As this distance is shorter than that through which the lever is permitted to move when it clears the stop plate, the range of movement of the teat cup levers and pressure plates is correspondingly smaller.

In use the machine may be suspended underneath the cow by straps which are not shown in the drawings. After thus attaching the machine, the teat cups are adjusted laterally and longitudinally on their supporting frames, as may be necessary to bring the cups underneath the teats, and insert the latter to their bases in the cups. The hand lever is then operated, whereby the compressing devices of the front and rear sets of teat cups are alternately actuated in the manner hereinbefore described.

I claim as my invention—

1. In a cow milking machine, the combination with a set of compressing devices operating against the base of the teat, of pressure plates operating against the lower portion of the teat, and means for actuating said devices and pressure plates, substantially as set forth.

2. In a cow milking machine, the combination with a teat cup, of a set of pivoted compressing levers operating with their free upper portions against the base of the teat, pressure plates attached at their upper portions to said levers and operating with their free lower portions against the lower portion of the teat, and means for successively closing said levers and pressure plates, substantially as set forth.

3. In a cow milking machine, the combination with a stationary support, of a pair of teat compressing levers pivoted to said support, whereby the same are held from vertical movement, pressure plates attached to said levers and capable of inward and outward movement independently of said levers, a vertically reciprocating frame arranged below said compressing levers, operating devices for said levers carried by said frame, connections between the pressure plates and the reciprocating frame for operating said plates, and means for actuating the reciprocating frame, substantially as set forth.

4. In a cow milking machine, the combination with a set of compressing levers, of pressure plates carried by said levers and operating against the lower portion of the teat, a reciprocating frame, and links connecting said pressure plates with said reciprocating frame, substantially as set forth.

5. In a cow milking machine, the combination with a pair of compressing levers, of pressure plates pivoted at their upper portions to said levers and each provided with an upright guide, a vertically reciprocating actuating arm or frame, and links pivoted at one end to said actuating arm or frame and sliding with their opposite ends in the guides of the pressure plates, substantially as set forth.

6. In a cow milking machine the combination with a pair of compressing levers, of pressure plates pivoted at their upper portions to said levers and each provided with an upright guide, a vertically reciprocating actuating arm or frame, and links pivoted at one end to said actuating arm or frame and provided at their opposite ends with cross heads which slide in the guides of the pressure plates, substantially as set forth.

7. In a cow milking machine, the combination with the stationary main frame of a pair of compressing levers pivoted between their ends to a support mounted on the main frame, a vertically reciprocating frame, and a wedge or cam arranged on said frame and engaging between the lower arms of said levers, substantially as set forth.

8. In a cow milking machine, the combination with a fixed support, of front and rear sets of compressing levers attached to said support, pressure plates attached to said levers a vertically reciprocating frame arranged underneath each set of such levers and pressure plates, actuating devices for said levers and pressure plates mounted on said reciprocating frames, and a hand lever connected with said reciprocating frames on opposite sides of its fulcrum, whereby said frames are alternately moved in opposite directions, substantially as set forth.

9. In a cow milking machine, the combination with the front and rear sets of teat compressing devices, of vertically reciprocating frames each carrying the actuating means of a set of such devices, and a hand lever having its arms detachably connected with said frame, substantially as set forth.

10. In a cow milking machine, the combination with the stationary main frame, the teat compressing devices and the vertically movable frames for operating the same, of a hand lever provided on opposite sides of its fulcrum with catches carrying studs or pivots adapted to engage in openings formed in the vertically movable frames, substantially as set forth.

11. In a cow milking machine, the combination with the teat compressing devices and their actuating means, of a hand lever for operating said means, and a retractible recessed stop plate having stops or shoulders for limiting the stroke of the hand lever, substantially as set forth.

12. In a cow milking machine, the combination with the base frame having upright posts, of a superposed main frame carrying the teat cups and their compressing devices, and having tubular uprights fitting over the posts of the base and made vertically adjustable thereon, substantially as set forth.

Witness my hand this 9th day of February, 1893.

JOSIAH C. FAY.

Witnesses:
JULIAN P. WOOD,
HERBERT J. WILLARD.